US012601925B2

(12) United States Patent  
Liu et al.

(10) Patent No.: US 12,601,925 B2  
(45) Date of Patent: Apr. 14, 2026

(54) VIRTUAL IMAGE DISPLAY OPTICAL ARCHITECTURES

(71) Applicant: HUAWEI TECHNOLOGIES CO., LTD., Shenzhen (CN)

(72) Inventors: Zhiqiang Liu, Redmond, WA (US); Akash Arora, Normandy Park, WA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 944 days.

(21) Appl. No.: 17/865,088

(22) Filed: Jul. 14, 2022

(65) Prior Publication Data

US 2022/0350158 A1 Nov. 3, 2022

Related U.S. Application Data

(63) Continuation of application No. PCT/US2020/014605, filed on Jan. 22, 2020.

(51) Int. Cl.

| | |
|---|---|
| H01S 3/00 | (2006.01) |
| G02B 27/01 | (2006.01) |
| G02B 27/12 | (2006.01) |
| H04N 9/31 | (2006.01) |

(52) U.S. Cl.  
CPC ....... *G02B 27/123* (2013.01); *G02B 27/0172* (2013.01); *H04N 9/3152* (2013.01); *G02B 2027/013* (2013.01); *G02B 2027/0178* (2013.01)

(58) Field of Classification Search  
CPC .............. G02B 27/123; G02B 27/0172; G02B 2027/013; G02B 2027/0178; H04N 9/3152  
See application file for complete search history.

(56) References Cited

U.S. PATENT DOCUMENTS

2016/0097929 A1* 4/2016 Yee ........................ G06T 19/006  
359/633

FOREIGN PATENT DOCUMENTS

| | | | |
|---|---|---|---|
| CN | 107300777 A | 10/2017 | |
| CN | 108646419 A * | 10/2018 | ......... G02B 27/0012 |
| WO | 2019096038 A1 | 5/2019 | |
| WO | WO 2020113244 A1 * | 6/2020 | ......... G02B 17/0621 |

OTHER PUBLICATIONS

Extended European Search Report in European Appln No. 20728887. 9, dated Nov. 21, 2022, 7 pages.  
EP Communication Pursuant to Article 94(3) EPC in European Appln No. 20728887.9, dated Jul. 1, 2024, 5 pages.

* cited by examiner

*Primary Examiner* — Mark Hellner  
(74) *Attorney, Agent, or Firm* — Fish & Richardson P.C.

(57) ABSTRACT

A virtual image display system includes: a light source for projecting an image; a first beamsplitter including a first free-form curved surface; and a second beamsplitter including a second free-form curved surface facing the first free-form surface of the first beamsplitter, in which the first free-form curved surface is separated from the second-free form curved surface of the second beamsplitter by free space, and in which the first beamsplitter and the second beamsplitter are arranged to redirect light emitted from the light source toward a user to form a virtual image.

19 Claims, 4 Drawing Sheets

200

Define Optimization Problem
202

Set Pre-Design Parameters
204

Select Starting Point Design
206

203

Perform Baseline Analysis of Starting Point Design
208

Perform Optimization
210

201

Analyze Optimized Design
212

Release Design Manufacturing Files and Fabricate Optimal Elements
214

400

402

406

404

VIRTUAL IMAGE DISPLAY OPTICAL ARCHITECTURES

CROSS-REFERENCE TO RELATED APPLICATIONS

This application is a continuation of International Application No. PCT/US2020/014605, filed on Jan. 22, 2020, the disclosure of which is incorporated herein by reference in its entirety.

TECHNICAL FIELD

The present disclosure relates to optical architectures for virtual image displays.

BACKGROUND

Augmented reality (AR) displays are used to overlay 2D or 3D images over real-world images. The overlaid images can be constructive (i.e., additive to the natural environment) or destructive (i.e., masking of the natural environment). AR displays attempt to interweave the images with the physical world such that the images are perceived as an immersive aspect of the real environment. In some cases, AR displays are incorporated into head-mounted devices, such as helmets or eyeglasses, and include multiple optical elements for generating the AR image and redirecting the AR image to a user.

SUMMARY

In general, in some aspects, the subject matter of the present application is embodied in virtual image display systems that include: a light source operable to project image; a first beamsplitter including a first free-form curved surface; and a second beamsplitter including a second free-form curved surface facing the first free-form curved surface of the first beamsplitter, where the first free-form curved surface is separated from the second free-form curved surface of the second beamsplitter by free space, and where the first beamsplitter and the second beamsplitter are arranged to redirect light emitted from the light source toward a user to form a virtual image.

Implementations may include one or more of the following features. For example, in some implementations, the second free-form curved surface is arranged to receive light from the light source and redirect a portion of the light from the light source toward the first free-form curved surface as first redirected light, and where the first free-form curved surface of the first beamsplitter is arranged to receive the first redirected light and redirect a portion of the first redirected light back to the second free-form curved surface as second redirected light.

In some implementations, the second free-form curved surface of the second beam-splitter is arranged to receive the second redirected light and redirect a portion of the second redirected light back to the first free-form curved surface as third redirected light.

In some implementations, the first beamsplitter is arranged to receive the third redirected light and deliver the third redirected light to an exit pupil plane corresponding to a location of an eye of the user.

In some implementations, an optical path length of the light from the light source to the exit pupil plane is less than two focal lengths.

In some implementations, the first beamsplitter includes a third free-form curved surface arranged on a side of the first beamsplitter that opposes the first free-form curved surface and faces the user.

In some implementations, the virtual image display system further includes a field corrector lens operable to correct for one or more optical aberrations.

In some implementations, the field corrector lens is arranged in front of the light source and redirects the light emitted from the light source toward the second beamsplitter.

In some implementations, the field corrector lens includes a first field corrector free-form curved surface facing the light source and a second field corrector free-form curved surface, where light from the light source enters the field corrector lens through the first field corrector free-form curved surface and exits the field corrector lens through the second field corrector free-form curved surface.

In some implementations, the second beamsplitter includes a fourth free-form curved surface arranged on a side of the second beamsplitter opposite from the second free-form curved surface, where the first beamsplitter and the second beamsplitter are arranged such that optical radiation incident on the fourth free-form curved surface passes through the second beam-splitter and the first beam splitter to the exit pupil plane.

In some implementations, the virtual image display system is wearable.

In some implementations, the virtual image display system includes eyeglasses.

In some implementations, the eyeglasses include a first frame in which the first beamsplitter and the second beamsplitter are arranged.

In some implementations, the eyeglasses include: a second frame; a third beamsplitter identically shaped as the first beamsplitter; and a fourth beamsplitter identically shaped as the second beamsplitter, where the third beamsplitter is separated from the fourth beamsplitter by free space, and where the third beamsplitter and the fourth beamsplitter are arranged to redirect light emitted from the light source toward the user to form part of the virtual image.

Various implementations of the present subject matter may have one or more of the following advantages. For example, by forming the optics so that the first free-form surface is separated from the second free-form surface by air, optical aberrations, such as wavelength dispersion, caused by light propagation through optical elements may be reduced. Additionally, in some implementations, the size and/or mass of the optical elements can be reduced, which may advantageously allow for more compact, lighter weight, and less costly virtual image display systems to be constructed. These advantages may also be useful specifically for wearable AR display devices, such as AR glasses, since they can permit improvements in design form factor that lead to more attractive eyeglass design.

The details of one or more embodiments are set forth in the accompanying drawings and the description below. Other features and advantages of the invention will be apparent from the description, and drawings, and claims.

DETAILED DESCRIPTION

In general, in some aspects, the subject matter of the present disclosure is directed to virtual image display systems. The virtual image display systems include: a light source for projecting an image, as well as optics including a first beam-splitting element having a first free-form curved surface and a second beam-splitting element having a second free-form curved surface facing the first free-form surface of the first beam-splitting element. The first free-form curved surface is separated from the second-free form curved surface of the second beam-splitting element by free space, and both beam-splitting elements are arranged to redirect light emitted from the light source toward a user to form a virtual image. By forming the optics so that the first free-form surface is separated from the second free-form surface, optical aberrations, such as wavelength dispersion, caused by light propagation through optical elements may be reduced. Additionally, in some implementations, the size and/or mass of the optical elements can be reduced, which may advantageously allow for more compact, lighter weight, and less costly virtual image display systems to be constructed. These advantages may also be useful specifically for wearable AR display devices, such as AR glasses, since they can permit improvements in design form factor that lead to more attractive eyeglass design.

Figure 1:
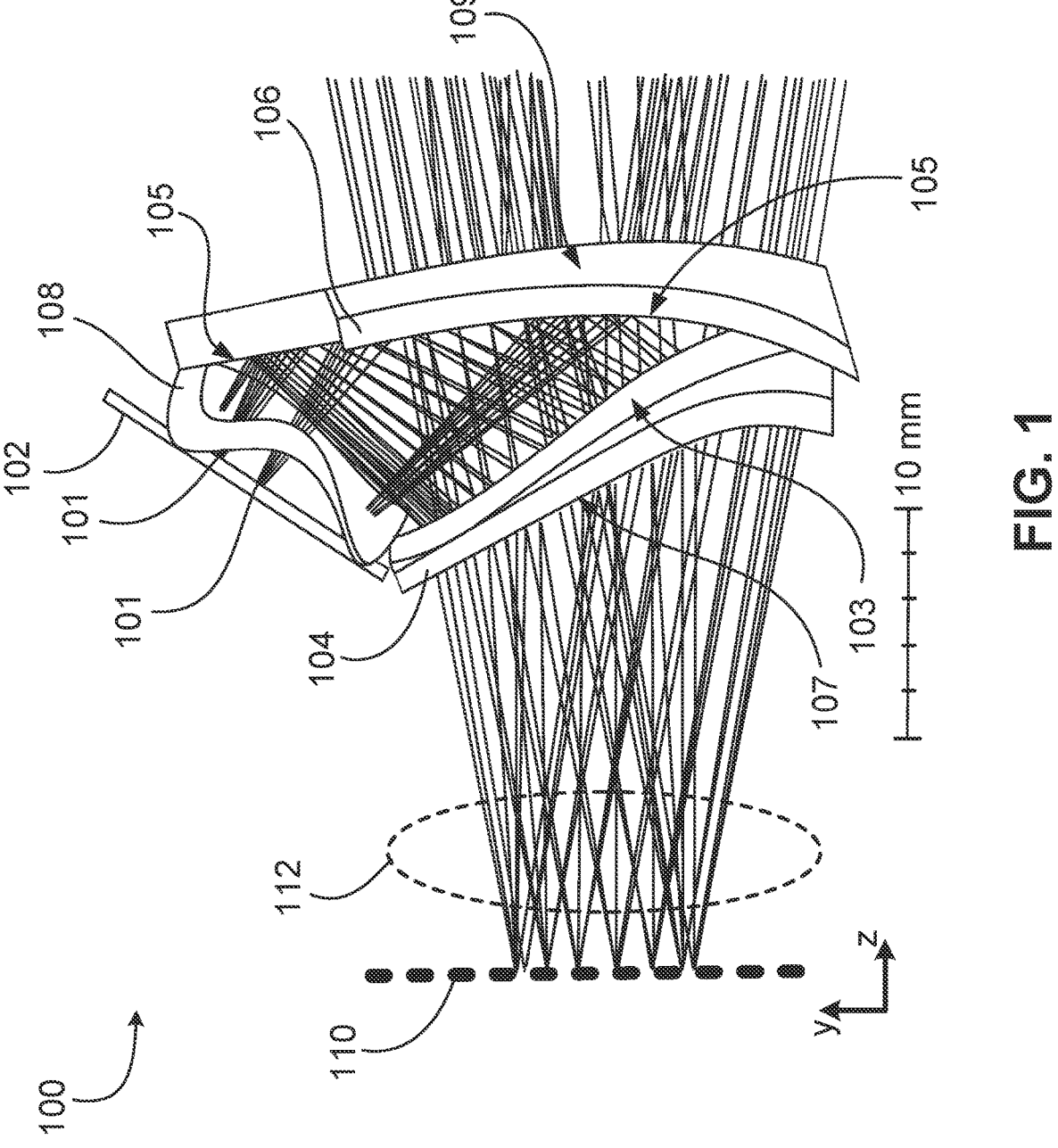
FIG. 1 is a schematic that illustrates an exemplary virtual image display system.

FIG. 1 is a schematic that illustrates an exemplary virtual image display system 100 according to the present disclosure. As shown in FIG. 1, the virtual image display system 100 includes a light source 102 (alternatively referred to as a light source projector) for projecting an image. The virtual image display system 100 further includes multiple optical elements positioned and arranged with respect to one another in order to redirect at least a portion of light emitted from the light source 102 toward a user's eye to form a virtual image. For instance, as shown in the example of FIG. 1, the virtual image display 100 includes a first beam-splitting element 104 and a second beam-splitting element 106, which are positioned and arranged to redirect light from the source 102 to a pupil plane 110. In some implementations, the pupil plane 110 corresponds to a location of an eye of a user. For implementations in which the virtual image display system is meant to overlay images onto the real-world images, the optical elements also allow transmission of visible light.

The light source 102 may include, e.g., a multiple pixel array of light generating elements, in which each light generating element is configured to emit a conical light ray bundle. The light generating elements of the pixel array may be configured to emit visible light of the same color or different colors. For instance, in some implementations, the light emitting elements may be configured to emit either red, green, or blue light. The light emitted by the light source 102 is redirected by the optical elements of the display 100 to form either a virtual 2D or 3D image. The light source 102 may include, e.g., a semiconductor micro light emitting diode (uLED) array, an organic light emitting diode (OLED) array, a liquid crystal array, or a digital light processing display, among other types of light sources. Self-emitting arrays including uLED and OLED are preferred for compactness and light-weight, because no illumination optics is required.

Both first optical element 104 and second optical element 106 are beam-splitting elements, also known as beamsplitters. That is, the optical elements 104, 106, depending on one or more properties of light (e.g., wavelength, angle of incidence, or polarization, among others) incident on one or more of their surfaces, may split the incoming light into at least two different components traveling along different directions. For instance, in some implementations, the beam-splitting elements 104, 106 may split incident light into a first portion that continues to travel through the beam-splitting element itself, and a second portion that is reflected or otherwise redirected away from the beam-splitting element. The intensity of light in each of the resulting components may be the same or different.

The beam-splitting elements 104, 106 of the present disclosure may be formed from material that is optically transparent to the wavelength of light emitted by the light source 102 (e.g., visible light) including, e.g., glass or plastic, and using one or more different structures. For example, in some implementations, the beam-splitting elements include a glass or a polymer sheet on which a transparently thin reflective coating is formed. The thin reflective coating may be formed from metal, such as aluminum deposited from aluminum vapor. It may also be dielectric layers deposited from a physical vapor deposition (PVD) process. The coating may be designed so that part of the light that is incident at a predetermined angle and not absorbed by the coating is transmitted, and the remainder is reflected. Other types of beam-splitters, such as polarization beam splitter, also may be used.

The surfaces of the beam-splitting elements 104, 106 that redirect the incident light to form the virtual image are free-form curved surfaces. A free-form curved surface includes a surface that has no translational or rotational symmetry about axes normal to the mean plane of the surface. Mathematically, freeform optical surfaces may be characterized through either local descriptions (such as radial basis functions and non-uniform rational B-splines) or global descriptions such as orthogonal polynomials, such as Zernike polynomials. The number of terms of the polynomial may vary depending on the complexity of the surface design. For instance, the number of polynomial terms may be from about 5 terms to about 70 terms. The free-form curved surfaces may be manufactured using a combination of turning, milling and micro-grinding and/or polishing. As shown in the example of FIG. 1, the first beam-splitting element 104 includes a first free-form curved surface 103 facing the second beam-splitting element 106. Likewise, the second beam-splitting element 106 includes a second free-form curved surface 105 that faces the first beam-splitting element 104. The first beam-splitting element 104 may also include a third free-form curved surface 107 arranged on a side of the first beam-splitting element 104 that opposes the first free-form curved surface 103 and faces the user. The second beam-splitting element 106 may also include a fourth free-form curved surface 109 arranged on a side of the second beam-splitting element 106 opposite from the second free-form curved surface 105. For ease of illustration, the body and surface 109 of second beam-splitting element 106 are omitted from a top portion of element 106 near light source 102 in FIG. 1, to show only free-form surface 105. The shapes of the free-form surfaces and the beam-splitting elements in FIG. 1 are only examples and do not limit the type of shapes that may be used.

The beam-splitting properties and arrangement of the optical components 104, 106 may be used to redirect the bundles of light rays emitted by the light source 102 to form a virtual image. For instance, as shown in FIG. 1, the second free-form curved surface 105 of the beam-splitting element 106 is arranged to receive the light bundles emitted by the light source 102 and redirect (e.g., by reflection) at least a portion of the received light bundles to the first beam-splitting element 104 as first redirected light. The first free-form curved surface 103 of the first beam-splitting element 104 is positioned to receive the first redirected light from the second beam-splitting element 106 and redirect (e.g., by reflection) at least a portion of the first redirected light back to the second beam-splitting element 106 as second redirected light. In turn, the second free-form curved surface 105 of the second beam-splitting element 106 receives the second redirected light and redirects (e.g., by reflection) at least a portion of the second redirected light back towards the first beam-splitting element 104 as the third redirected light. Upon reaching the first beam-splitting element 104, at least a portion 112 of the third redirected light passes through the first beam-splitting element 104 toward a user to form a virtual image. In particular, as shown in FIG. 1, at least a portion 112 of the third redirected light is delivered to an exit pupil plane 110 that may correspond to a location of an eye of a user.

Thus, the light emitted by the light source 102 is subject to three optical folds: a first fold that occurs when the light from the source 102 is first incident on the second beam-splitting element 106; a second fold that occurs when the first redirected light reaches the first beam-splitting element 104; and a third fold that occurs when the second redirected light reaches the second beam-splitting element 106. In addition to being designed to redirect light from the light source 102 toward the exit pupil plane 110, the optical elements of the virtual image display system 100 also may be positioned and configured to allow light from external to the system to pass through the optical components so that the virtual images are overlaid with real world images. For instance, the free-form curved surfaces of both the first beam-splitting element 104 and the second beam-splitting element 106 may be designed to allow light (e.g., visible light) incident on the fourth free-form curved surface to pass through the second beam-splitting element 106 and then through the first beam-splitting element 104 to the exit pupil plane to form a real-world image. The free-form curved surfaces 103 and 105 are configured to collimate the light from the light source 102 in addition to reflecting a portion of the light along a path that forms the virtual image. For instance, light from each pixel from the light source 102 is collimated by the free-form curved surface 103, 105 into a parallel ray bundle on the pupil plane 110. As an example, light emitted from a blue pixel on the light source 102 is collimated, after the three optical folds, into a bundle of parallel rays at the pupil plane 110. An optical path length of the light from the light source projector 102 to the exit pupil plane 110 may be less than two focal lengths. The focusing power is provided by the freeform surfaces.

As further shown in FIG. 1, the first and second beam-splitting elements 104, 106 are separated (i.e., spaced apart) from one another by free space. Thus, the space between the first beam-splitting element 104 and the second beam-splitting element 106 that is traversed by the light as it is folded multiple times may be filled with air having a refractive index equal to 1. In comparison, alternative configurations of optical components for virtual image display systems may require the light to propagate primarily within and through lens elements, such as prism elements. Because the refractive index of those materials varies with wavelength, different wavelengths of light will be subject to different effective optical pathlengths, leading to wavelength dispersion. However, by having the light of the presently disclosed systems primarily traverse free space between the first and second beam-splitting elements, the refractive index is 1 for all wavelengths of light emitted by the light source 102, such that wavelength dispersion can be reduced or effectively eliminated. Similarly, light incident on the virtual image display, which generates the real-world image may pass through the virtual image display 100 with reduced "see-through" distortion due to the free space region separating the first and second beam-splitting components 104, 106.

In some implementations, the virtual image display 100 further includes an additional optical component to correct for one or more optical aberrations. The one or more optical aberrations may include, e.g., spherical, coma, astigmatism, field curvature, or distortion. As shown in the example of FIG. 1, the display 100 includes an optional field corrector lens 108. The field corrector lens 108 is positioned in front of the light source 102 and is configured to refract the light emitted by source 102 in a predetermined manner to correct for one or more specified optical aberrations. The field corrector lens 108 may include a first free-form curved surface 111 and/or second free-formed curved surface 113 through which the light passes. The field corrector lens 108 may be formed from a material that is optically transparent to the wavelength of light emitted by the light source 102 including, e.g., glass or plastic. As shown in FIG. 1, the field corrector lens 108 is separated (i.e., spaced apart) from the second beam-splitting element 106 by free space. Thus, the space between the field correction lens 108 and the second beam-splitting element 106 that is traversed by the light may be filled with air having a refractive index equal to 1 that does not vary with wavelength. Accordingly, wavelength dispersion can be reduced.

To maintain low wavelength dispersion and low see-through distortion but provide sufficient structural integrity and strength, the thickness of the optical components (e.g., the first beam-splitting element 104, the second beam-splitting element 106 and the field corrector lens 108) may be kept within a predefined range. For instance, the physical thickness of the optical components may be between 0.4 mm and 2 mm. The thickness may be understood to be the distance between the free-form curved surfaces of the optical components, such as, e.g., the distance between the first free-form curved surface 103 and the third free-form curved surface 107 of the first beam-splitting element 104, the distance between the second free-form curved surface 105 and the fourth free-form curved surface 109 of the second beam-splitting element 106, and the distance between the two free-form curved surfaces of the field corrector lens.

The shape of the free-form curved surfaces of the beam-splitting elements 104, 106 and the field corrector lens 108 may be designed through one or more different design methods such as multi-parameter optimization, Wassermann-Wolf differential equations, tailoring method, point-to-point mapping, geometric and variational method, or simultaneous multiple surface method. In a multi-parameter optimization, a designer may establish a merit function that characterizes the optical performance of the virtual image display in forming a virtual image. Using appropriate software tools, the surface of the optical elements may be seeded with an initial surface design and then iteratively refined until the merit function is optimized. The parameters of freeform surface are set to optimize the surface gradually until the design requirements are met. Further details on multi-parameter optimization and the other design methods can be found, e.g., in the article "Design of freeform optics" by Fang et al., Adv. Opt. Techn. 2013; 2(5-6), which is incorporated herein by reference in its entirety.

Figure 2:
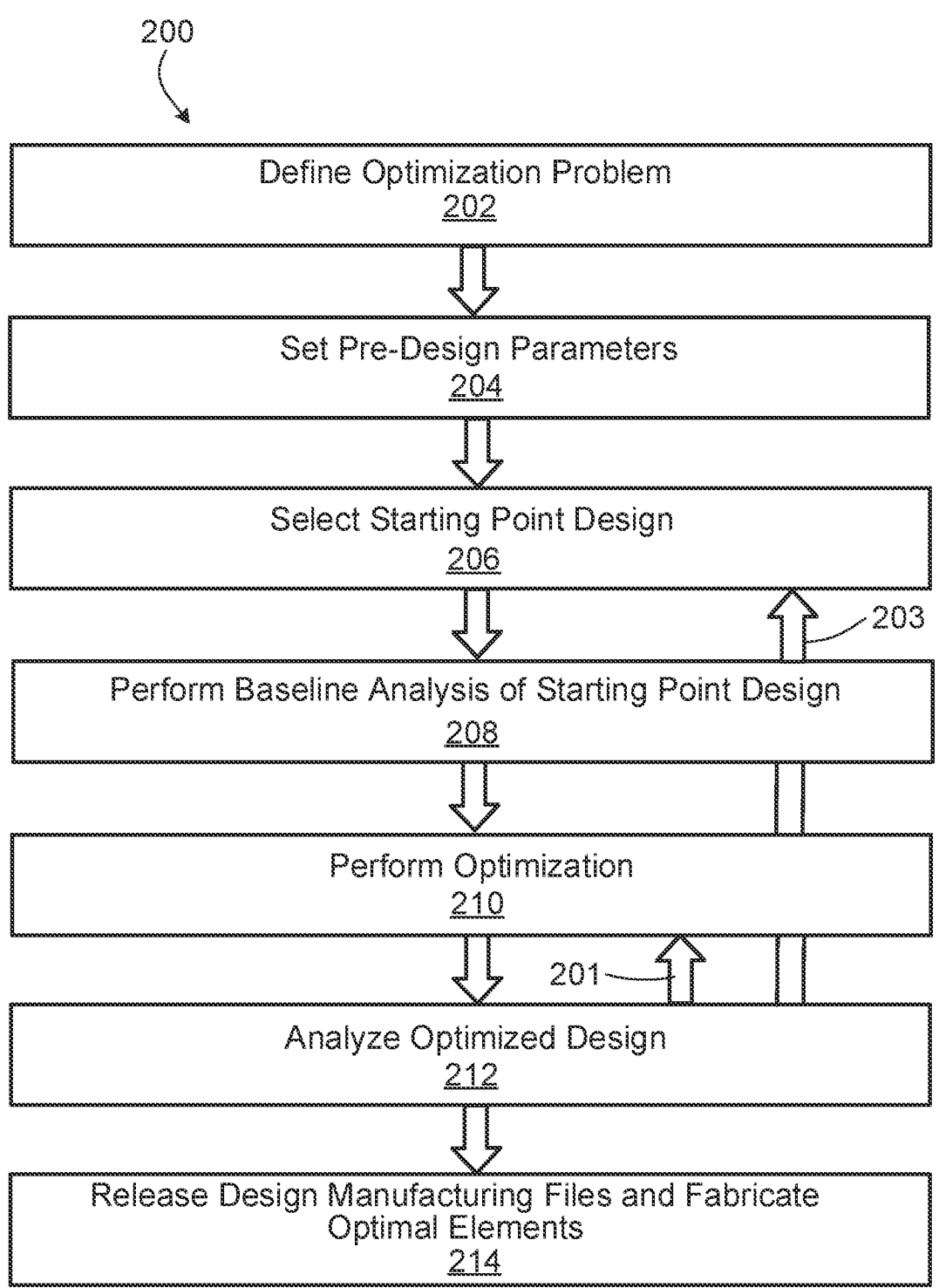
FIG. 2 is a flow chart that depicts an exemplary process for designing the optical elements of a virtual image display system.

FIG. 2 is a flowchart that depicts an exemplary multi-parameter design process 200 for designing the free-form curved optical element surface of a virtual image display system, such as the system 100 shown in FIG. 1. In a first step 202, the problem is defined, which includes, e.g., translating requirements and boundaries to optical and performance specifications, tradeoffs and compromises. For instance, a design may account for one or more characteristics of the display that can impact user experience, such as field of view (FOV) and exit pupil diameter, among others. Increasing FOV makes the experience more immersive whereas increasing exit pupil diameter makes the ability to see images easier for the user. In certain implementations, the value of these characteristics, among others, are balanced to obtain a desired overall user experience.

After defining the problem, the process 200 proceeds to pre-design 204, in which multiple high level design parameters are defined including, e.g., the overall number of optical elements, the size of the optical elements, and whether to use reflecting or refracting structures. Further, a rough graphical ray tracing may be performed in this step. Other display parameters and considerations, such as the tradeoff between FOV and exit pupil diameter may also be further analyzed in the pre-design step.

At step 206, a starting point selection is made, at which point a design is generated. The starting point design may be a similar existing design or a design that is generated from scratch. Various design parameter tradeoffs can be analyzed at this step including, e.g., the different surface types such as whether to use a spherical and/or aspherical surface, the material selection such as whether to use glass and/or plastic, the placement of physical aperture, and the incidence angle of the rays on surfaces, among others.

Using the starting point design, a baseline starting point analysis is performed in step 208. Optical performance of the display design is benchmarked to the display specification requirements. Gaps between display specification requirements and the optical performance of the display as currently designed are identified and an optimization strategy is generated. One or more variables are identified for the following design optimization step.

Following the initial analysis, the optimization process is performed in step 210. This may include, e.g., defining one or more variables, one or more error functions, and one or more constraints on the optical design. Optical design is a multi-dimensional problem.

In step 212, the design obtained by the optimization process of step 210 is analyzed to determine how well the optimized design is in compliance with optical design specifications. At this step, variables may be added or removed, and design constraints may be altered. The optimization process 210 may then be re-run (201) using the updated parameters. In some implementations, a new design is selected or generated and the process reverts (203) back to step 206.

When the optimized design is in compliance with specifications, additional analysis may be performed as part of step (212) to identify sensitivity to manufacturing errors, sensitivity to environmental conditions, and stray light impact. For instance, examples of manufacturing errors can include: optical surface decenter (or lateral xy shift), optical surface tilt, lens or optical element decenter, lens or optical element tilt, lens or optical element thickness, deviation in designed air gap thickness distance between two adjacent lens elements, optical surface accuracy, deviation in designed index of refraction, and deviation in designed abbe number. Decenter and tilt are errors that may break aberration correction and degrade optical performance.

The optimization process 210 may then be re-run (201) to de-sensitize the design. In some implementations, a new design is selected to or generated and the process reverts (203) back to step 206. Opto-mechanical design is done in this step to support the additional analysis.

Finally, once the optimization and analysis process has been completed and the design satisfies the desired optical design specifications, the 2D and 3D computer-aided-design/manufacturing (CAD/CAM) files are released (214) for manufacturing the optical components. As explained above, manufacturing the free-form curved surfaces may include using a combination of turning, milling and micro-grinding and polishing.

Figure 3:
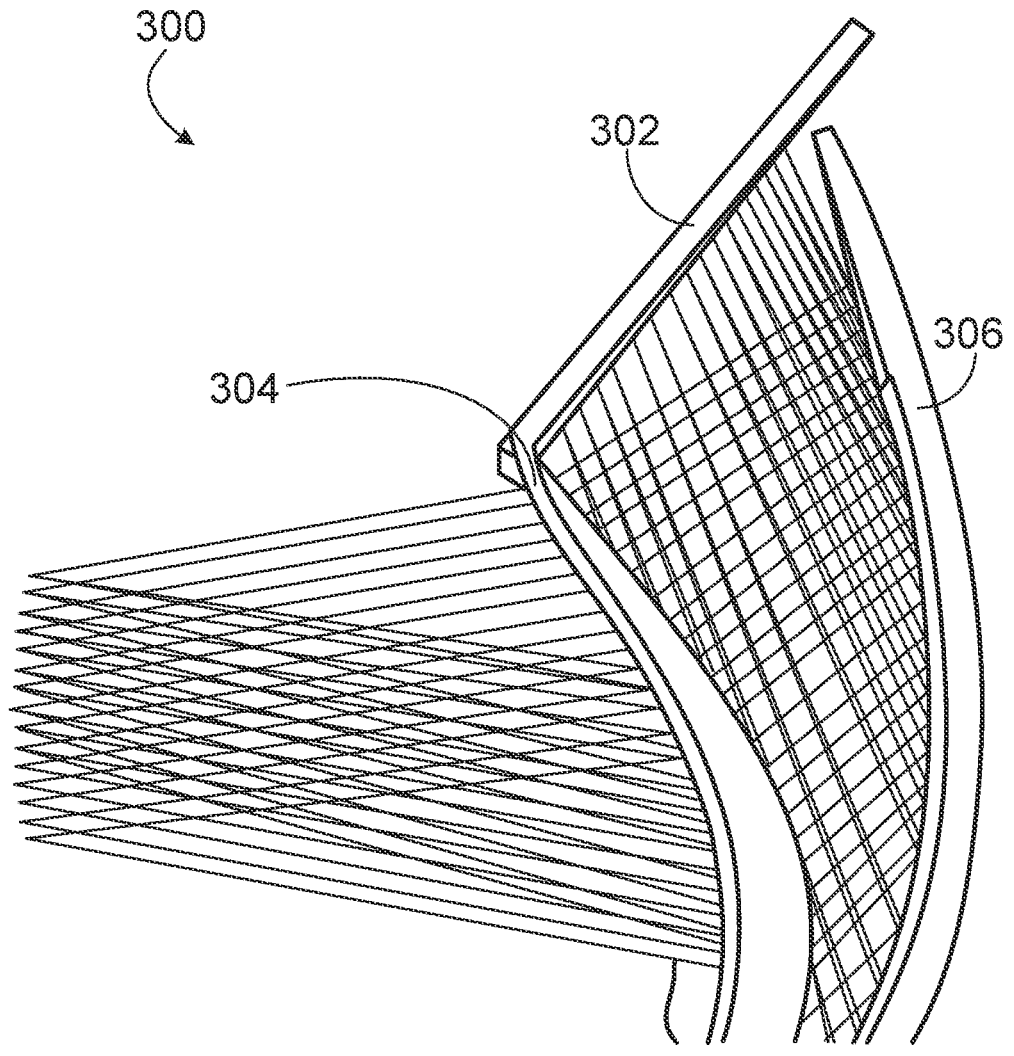
FIG. 3 is a schematic that illustrates an exemplary virtual image display system.

As explained herein, the virtual image display can be formed without the field corrector lens. FIG. 3 is a schematic illustrating an exemplary virtual image display system 300 that excludes the field corrector lens. As shown in FIG. 3, the system 300 includes a light source 302, a first beam-splitting element 304 and a second beam-splitting element 306. Each of the light source 302, first beam-splitting element 304 and second beam-splitting element 306 may be constructed and positioned in a similar manner as described herein with respect to light source 102, first beam-splitting element 104, and second beam-splitting element 106, respectively. Removing the field corrector lens may reduce the number of degrees of freeform for optical aberration correction, leading to a potential reduction performance. However, due to the reduced number of parts, a virtual image display system that excludes the field corrector lens also may be lighter in weight, have reduce cost, and have reduced size for improved form factor.

Figure 4:
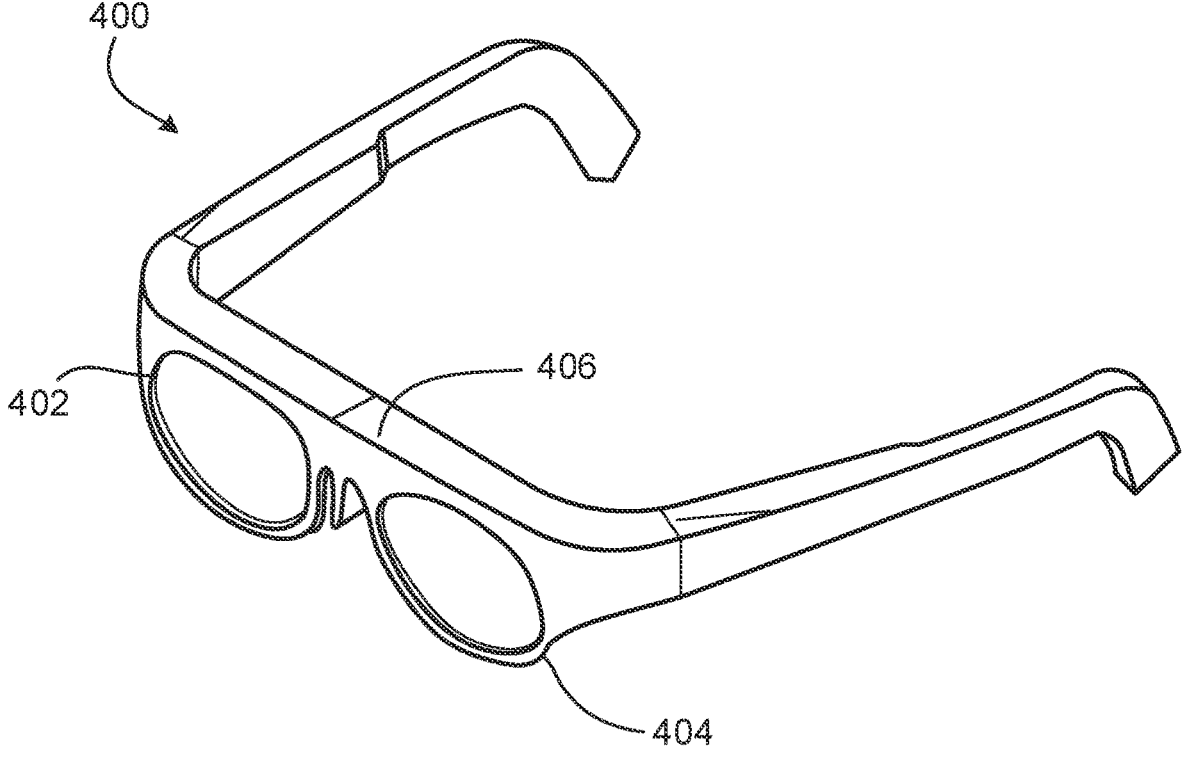
FIG. 4 is a schematic that illustrates exemplary eyeglasses that incorporate a virtual display system.

As explained herein, the virtual image display systems of the present disclosure may be embodied in a wearable device. For instance, the virtual image display may be incorporated into a pair of eyeglasses. FIG. 4 is a schematic that illustrates exemplary eyeglasses 400 that include a virtual display system. The eyeglasses 400 include a first frame 402 and a second frame 404. Each of the first frame 402 and the second frame 404 can include, e.g., multiple optical elements configured and arranged to redirect light from a light source and form a virtual image that can be seen by a user wearing the eyeglasses 400. For example, the first frame 402 may include a first beam-splitting element having free-form curved surfaces similar to element 104 and a second beam-splitting element having free-form curved surfaces similar to element 106. Both beam-splitting elements within frame 402 may be arranged in a similar manner as beam-splitting elements 104, 106 to redirect light from a light source to form a virtual image. For instance, both beam-splitting elements within frame 402 may be separated by free space and be configured so that their free-form curved surfaces reflect at least a portion of light emitted from a light source toward an exit pupil plane to form a virtual image.

Likewise, the second frame 404 may include a first beam-splitting element having free-form curved surfaces similar to element 104 and a second beam-splitting element having free-form curved surfaces similar to element 106. Both beam-splitting elements within second frame 404 may be arranged in a similar manner as beam-splitting elements 104, 106 to redirect light from a light source to form a virtual image. For instance, both beam-splitting elements within frame 404 may be separated by free space and be configured so that their free-form curved surfaces reflect at least a portion of light emitted from a light source toward an exit pupil plane to form a virtual image.

In some implementations, the eyeglasses 400 may include a single contiguous light source formed within a bridge 406 of the eyeglass frame. The light source within bridge 406 may be a light source 102 as described herein with respect to FIG. 1. The single contiguous light source may provide light to both the beam-splitting elements within the first frame 402 and to both the beam-splitting elements within the second frame 404. In some implementations, the bridge 406 of the eyeglasses 400 include two separate light sources. For instance, a first light source may be formed within the bridge 406 directly above the first frame 402 to provide light to the optical elements formed within first frame 402. And a second light source may be formed within the bridge 406 directly above the second frame 404 to provide light to the optical elements formed within the second frame 404. Each of the two light sources may be a light source 102 as described herein with respect to FIG. 1.

Although two frames are shown for the eyeglasses 400 in FIG. 4, the eyeglasses alternatively may be formed to have a single frame such that the optical elements within the single frame extend in front of both eyes of a user when the user wears the eyeglasses. In such a case, the single frame may include a single first beam-splitting element having a free-form curved surface similar to element 104 and a single second beam-splitting element having free-form curved surfaces similar to element 106. Both beam-splitting elements within the single frame may be arranged in a similar manner as beam-splitting elements 104, 106 to redirect light from a light source to form a virtual image.

In some implementations, the two frames 402, 404 or the single frame of the eyeglasses 400 also include a field correction lens, such as the field correction lens 108 described herein with respect to FIG. 1. The field correction lens or lenses may be configured and arranged similar to the field correction lens 108 to reduce optical aberrations within the virtual image that is formed.

A number of embodiments have been described. Nevertheless, it will be understood that various modifications may be made without departing from the spirit and scope of the invention. Accordingly, other embodiments are within the scope of the following claims.

What is claimed is:

1. A virtual image display system comprising:
a light source operable to project an image;
a first beamsplitter comprising a first free-form curved surface; and
a second beamsplitter comprising a second free-form curved surface facing the first free-form curved surface of the first beamsplitter,
wherein the first free-form curved surface is separated from the second free-form curved surface of the second beamsplitter by free space,
wherein the first beamsplitter and the second beamsplitter are arranged to redirect light emitted from the light source toward a user to form a virtual image,
wherein the second free-form curved surface is arranged to redirect a portion of light toward the first free-form curved surface as first redirected light,
wherein the first free-form curved surface of the first beamsplitter is arranged to receive the first redirected light and redirect a portion of the first redirected light back to the second free-form curved surface as second redirected light, and wherein the second free-form curved surface of the second beamsplitter is arranged to receive the second redirected light and redirect a portion of the second redirected light back to the first free-form curved surface as third redirected light.

2. The virtual image display system of claim 1, wherein the second free-form curved surface is arranged to receive the light from the light source.

3. The virtual image display system of claim 1, wherein the first beamsplitter is arranged to receive the third redirected light and deliver the third redirected light to an exit pupil plane corresponding to a location of an eye of the user.

4. The virtual image display system of claim 3, wherein an optical path length of the light from the light source to the exit pupil plane is less than two focal lengths.

5. The virtual image display system of claim 3, wherein the first beamsplitter comprises a third free-form curved surface arranged on a side of the first beamsplitter that opposes the first free-form curved surface and faces the user.

6. The virtual image display system of claim 3, further comprising a field corrector lens operable to correct for one or more optical aberrations.

7. The virtual image display system of claim 6, wherein the field corrector lens is arranged in front of the light source and redirects the light emitted from the light source toward the second beamsplitter.

8. The virtual image display system of claim 6, wherein the field corrector lens comprises a first field corrector free-form curved surface facing the light source and a second field corrector free-form curved surface, wherein light from the light source enters the field corrector lens through the first field corrector free-form curved surface and exits the field corrector lens through the second field corrector free-form curved surface.

9. The virtual image display system of claim 3, wherein the second beamsplitter comprises a fourth free-form curved surface arranged on a side of the second beamsplitter opposite from the second free-form curved surface, wherein the first beamsplitter and the second beamsplitter are arranged such that optical radiation incident on the fourth free-form curved surface passes through the second beamsplitter and the first beamsplitter to the exit pupil plane.

10. The virtual image display system of claim 1, wherein the virtual image display system is wearable.

11. The virtual image display system of claim 10, wherein the virtual image display system is a pair of eyeglasses.

12. The virtual image display system of claim 11, wherein the eyeglasses comprise a first frame in which the first beamsplitter and the second beamsplitter are arranged.

13. The virtual image display system of claim 12, wherein the eyeglasses comprise:
a second frame;
a third beamsplitter identically shaped as the first beamsplitter; and
a fourth beamsplitter identically shaped as the second beamsplitter, wherein the third beamsplitter is separated from the fourth beamsplitter by free space, and
wherein the third beamsplitter and the fourth beamsplitter are arranged to redirect light emitted from the light source toward the user to form part of the virtual image.

14. The virtual image display system of claim 11, wherein the pair of eyeglasses comprises a bridge coupling a first frame of the eyeglasses to a second frame of the eyeglasses, and wherein the light source is formed within the bridge.

15. The virtual image display system of claim 14, wherein the bridge comprises a single light source configured to provide light to the first frame of the eyeglasses and to the second frame of the eyeglasses.

16. The virtual image display system of claim 14, wherein the light source comprises two separate light sources, wherein a first light source of the two separate light sources is configured to provide light to the first frame, and wherein a second light source of the two separate light sources is configured to provide light to the second frame.

17. The virtual image display system of claim 10, wherein virtual display system has a single frame arranged to extend in front of both eyes of a user.

18. The virtual image display system of claim 17, wherein the single frame comprises the first beamsplitter and the second beamsplitter.

19. The virtual image display system of claim 1, wherein the first beamsplitter and the second beamsplitter are arranged to cause the light emitted from the light source to be subject to three optical folds before reaching an exit pupil plane.

* * * * *